United States Patent
Gioscia

[11] Patent Number: 5,568,873
[45] Date of Patent: Oct. 29, 1996

[54] HEIGHT EXPANDABLE RACK FOR COMPACT DISCS

[76] Inventor: H. Thomas Gioscia, 137 Water Mill Towd Rd., Water Mill, N.Y. 11976

[21] Appl. No.: 402,474
[22] Filed: Mar. 10, 1995
[51] Int. Cl.⁶ ........................................ A47F 7/00
[52] U.S. Cl. .................. 211/40; 211/163; 211/194; 312/9.46
[58] Field of Search ................. 211/40, 41, 194, 211/163, 131; 312/9.9, 9.46, 9.45

[56] References Cited

U.S. PATENT DOCUMENTS

| | | | |
|---|---|---|---|
| 3,069,213 | 12/1962 | Azzarri | 211/40 X |
| 3,736,036 | 5/1973 | Mathus | 312/9.46 X |
| 3,862,787 | 1/1975 | Hilsinger | 312/9.46 X |
| 3,889,817 | 6/1975 | Berkman | 211/131 X |
| 4,802,587 | 2/1989 | Armijo et al. | 312/9.46 X |
| 5,188,240 | 2/1993 | Marino et al. | 211/163 X |
| 5,487,599 | 1/1996 | Weisburn et al. | 211/194 X |

Primary Examiner—Robert W. Gibson, Jr.
Attorney, Agent, or Firm—Michael I. Kroll

[57] ABSTRACT

A height expandable rack for compact discs comprising a plurality of plates. A structure is for storing a plurality of the compact discs in a horizontal plane on each plate. A facility is for stacking the plates together in an interconnected manner in a limited area space on a flat horizontal surface.

8 Claims, 2 Drawing Sheets

HEIGHT EXPANDABLE RACK FOR COMPACT DISCS

BACKGROUND OF THE INVENTION

1. Field of the Invention

The instant invention relates generally to compact disc holders and more specifically it relates to a height expandable rack for compact discs.

2. Description of the Prior Art

Numerous compact disc holders have been provided in prior art that are adapted to hold a plurality of compact discs in convenient and accessible locations when the compact discs are not in use. While these units may be suitable for the particular purpose to which they address, they would not be as suitable for the purposes of the present invention as heretofore described.

SUMMARY OF THE INVENTION

A primary object of the present invention is to provide a height expandable rack for compact discs that will overcome the shortcomings of the prior art devices.

Another object is to provide a height expandable rack for compact discs that has the ability to increase its storage capacity for compact discs with additional inexpensive stacking storage plates, instead of having to purchase an expensive large unit to accomplish this.

An additional object is to provide a height expandable rack for compact discs that needs limited area space to be placed into, while there is easy access to any compact disc stored within the stacking storage plates via a rotatable base.

A further object is to provide a height expandable rack for compact discs that is simple and easy to use.

A still further object is to provide a height expandable rack for compact discs that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

Similar reference characters denote corresponding features consistently throughout the attached drawings.

DETAILED DESCRIPTION OF THE PREFERRED EMBODIMENTS

Figure 1:
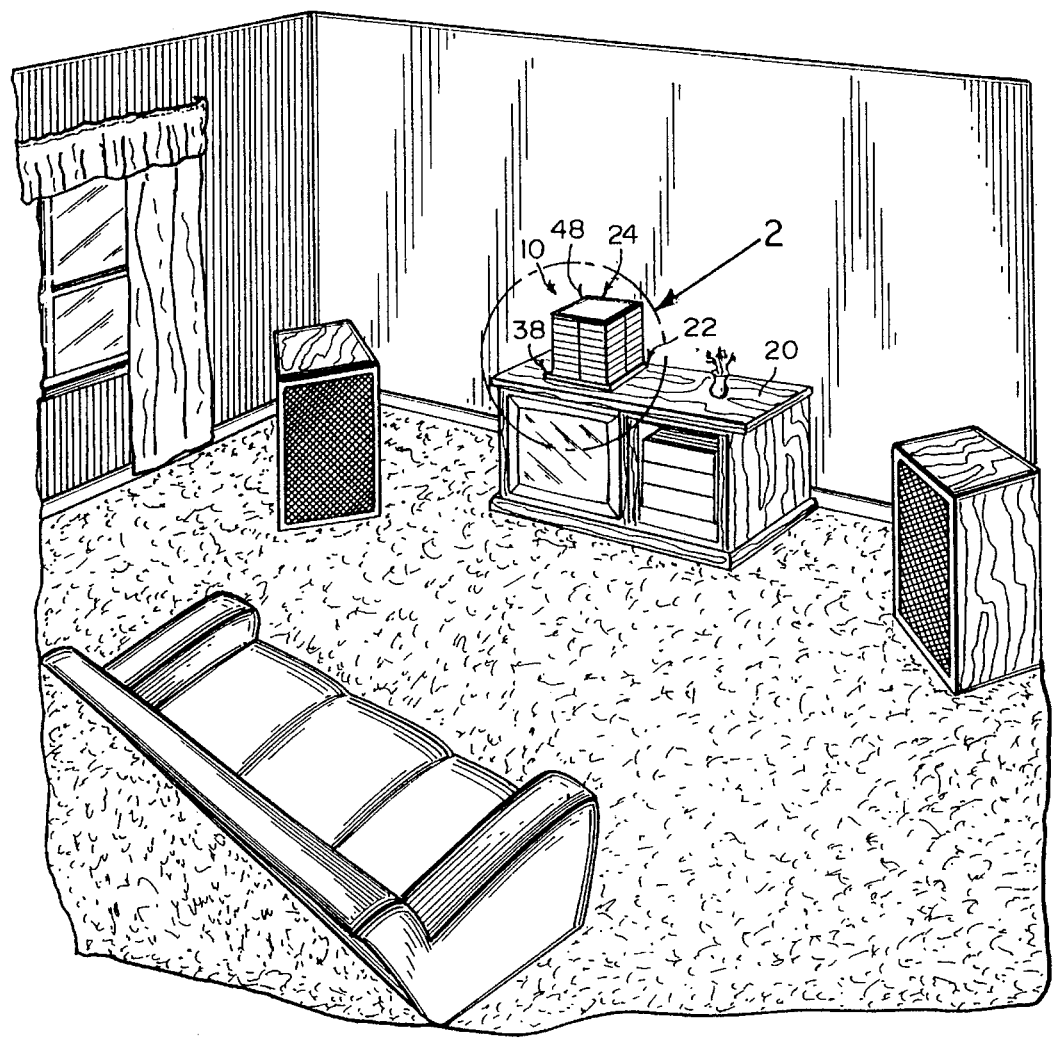
FIG. 1 is a perspective view of the instant invention located on top of a TV stereo system within a room.
Figure 2:
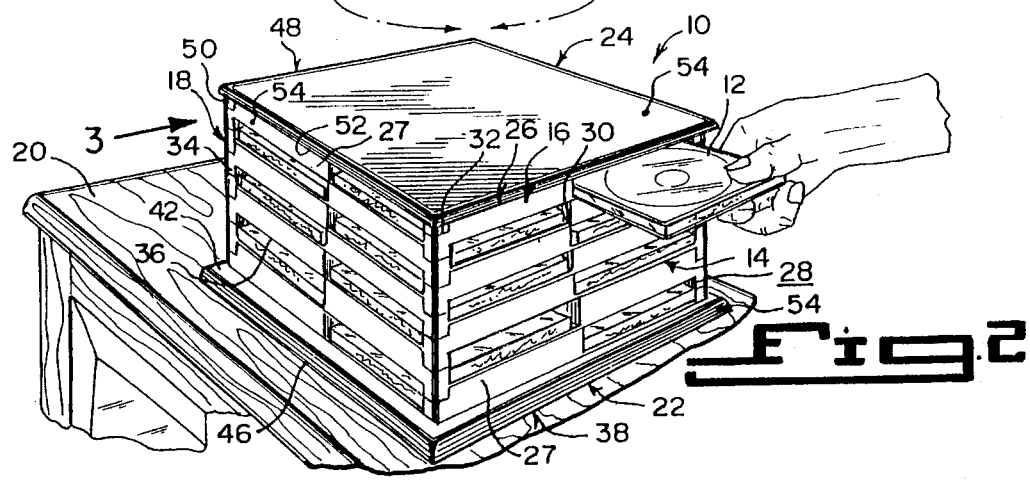
FIG. 2 is an enlarged perspective view as indicated by arrow 2 in FIG. 1.
Figure 3:
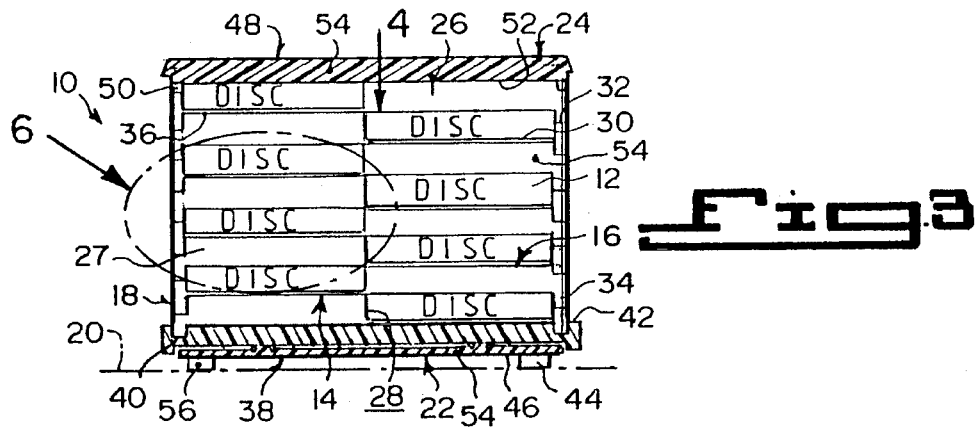
FIG. 3 is an elevational view partly in cross section taken in the direction of arrow 3 in FIG. 2.

Turning now descriptively to the drawings, in which similar reference characters denote similar elements throughout the several views, FIGS. 1 through 6 illustrate a height expandable rack 10 for compact discs 12, comprising a plurality of plates 14. A structure 16 is for storing a plurality of the compact discs 12 in a horizontal plane on each plate 14. A facility 18 is for stacking the plates 14 together in an interconnected manner in a limited area space on a flat horizontal surface 20.

A device 22 is for rotating the plates 14 on the flat horizontal surface 20, so that there is easy access to any compact disc 12 stored within the storing structures 16 on the plates 14. A component 24 is for covering the uppermost plate 14, to complete the configuration of the rack 10. Each plate 14 is square shaped.

The storing structure 16 consists of a cross framework 26 with bent arms 27 at right angles in the same direction, having four compartments 28 on a top surface 30 of each plate 14. Each compartment 28 extends inwardly from one side of the plate 14. The bent arms 27 of the stacked cross frameworks 26 are in alternate clockwise and counterclockwise extending directions on the plates 14.

The stacking facility 18 includes each cross framework 26 having four recessed corners 32. Each plate 14 has four feet 34. Each foot 34 extends from a corner on a bottom surface 36, to fit into each recessed corner 32 on the cross framework 26 below, in which the bent arms 27 are in the alternate extending direction.

The rotating device 22 consists of a lazy Susan base 38, having four recessed corners 40 on a top surface 42, so as to receive the feet 34 of the lowermost plate 14. Four pads 44 are secured to a bottom surface 46 of the lazy Susan base 38. The pads 44 will sit upon the flat horizontal surface 20 to maintain the lazy Susan base 38 in a stabilized manner.

The covering component 24 is a removable square shaped cap member 48 having four feet 50. Each foot 50 extends from a corner on a bottom surface 52, to fit into each recessed corner 32 on the cross framework 26 of the uppermost plate 14.

Each cross framework 16 is integrally formed with the top surface 30 of each respective plate 14 and is fabricated out of a high impact plastic material 54, which can be of any color and even transparent. The lazy Susan base 38 is also fabricated out of the high impact plastic material 54. The removable square shaped cap member 48 is also fabricated out of the high impact plastic material 54. Each pad 44 is fabricated out of a rubber material 56.

Figure 4:
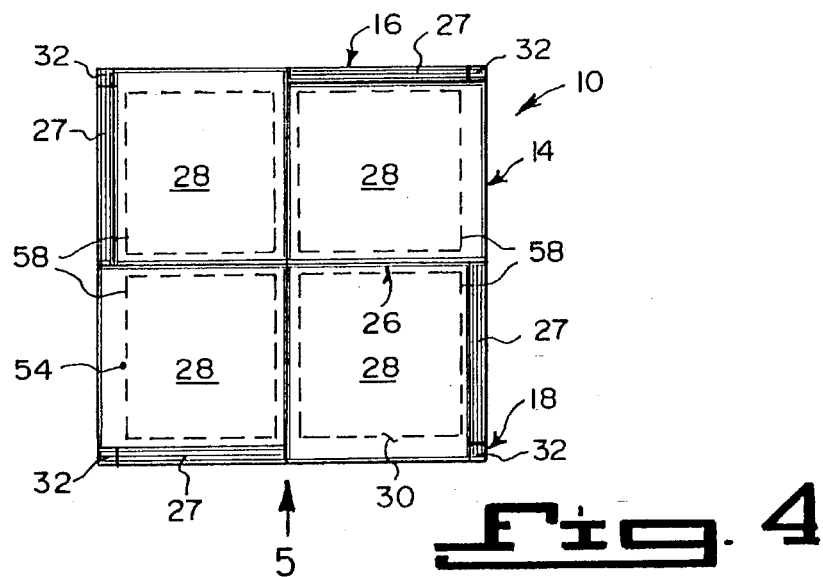
FIG. 4 is a top view of one of the stacking storage plates taken in the direction of arrow 4 in FIG. 3.
Figure 5:
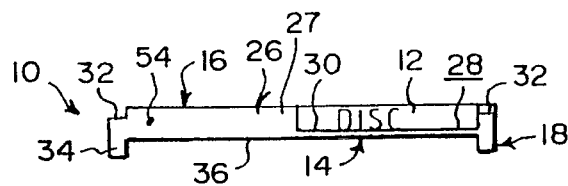
FIG. 5 is an elevational view taken in the direction of arrow 5 in FIG. 4.
Figure 6:
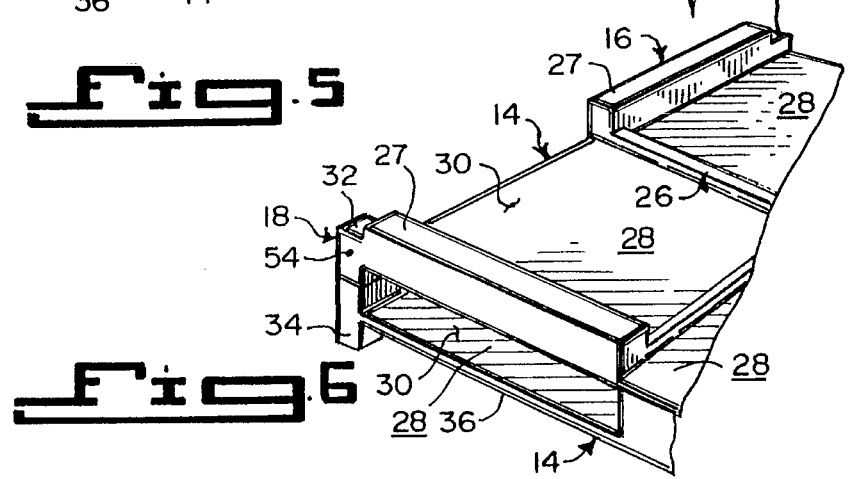
FIG. 6 is a further enlarged perspective view of a portion thereof, as indicated by arrow 6 in FIG. 3.

Each plate 14, as shown in FIG. 4, can further include a knock out section 58 at each compartment 28. Two single compact discs 12 or one double compact disc (not shown) can be stored in two matching compartments 28 in two stacked plates 14, when the knock out section 58 is removed from the upper stacked plate 14.

The knock out sections 58 in the plates 14 insure only the storage area that is required is obtained. This prevents additions of unwanted space and large incremental increases in the size of the rack 10.

By having compact discs 12 stacked in the horizontal plane, easy reading of titles, etc. is possible. Also by virtue of the single/double conversion feature of each plate 14 and its ability to be interposed anywhere in the rack 10, truly random positioning of any compact disc 12 is possible. Now accurate alphabetizing of compact discs 12 can be achieved.

OPERATION OF THE INVENTION

To use the height expandable rack 10, the following steps should be taken:

1. Put the pads 44 of the lazy Susan base 38 upon the flat horizontal surface 20.
2. Insert the feet 34 of the lowermost plate 14 into the recessed corners 40 of the lazy Susan base 38.
3. Insert the feet 34 of the other plates 14 into the matching recessed corners 32 of the cross frameworks 26 having the bent arms 27 in the alternate clockwise and counterclockwise extending directions.
4. Place the feet 50 of cap member 48 into the recessed corners 32 of the cross framework 26 on the uppermost plate.
5. Put in all of the compact discs 12 within the compartments 28.

Rotate the lazy Susan base 38 to locate any one of the compact discs 12, so that the compact discs 12 can be removed from the compartments 28 and played when needed.

LIST OF REFERENCE NUMBERS 10 height expandable rack
12 compact disc
14 plate
16 storing structure
18 stacking facility
20 flat horizontal surface
22 rotating device
24 covering component
26 cross framework
27 bent arm of 26
28 compartment of 26
30 top surface of 14
32 recessed corner of 26
34 foot of 14
36 bottom surface of 14
38 lazy Susan base of 22
40 recessed corner of 38
42 top surface of 38
44 pad
46 bottom surface of 38
48 removable square shaped cap member for 24
50 foot of 48
52 bottom surface of 48
54 high impact plastic material of 14, 16, 38, 48
56 rubber material of 44
58 knock out section in 14 at 28

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A height expandable rack for compact discs comprising:
   a) a plurality of plates, each said plate being square shaped;
   b) means for storing a plurality of the compact discs in a horizontal plane on each said plate, said storing means including a cross framework with bent arms at right angles in the same direction, having four compartments on a top surface of each said plate, with each said compartment extending inwardly from one side of said plate, whereby said bent arms of said stacked cross frameworks are in alternate clockwise and counterclockwise extending directions on said plates;
   c) means for stacking said plates together in an interconnected manner in a limited area space on a flat horizontal surface, said stacking means including each said cross framework having four recessed corners, and each said plate having four feet, whereby each said foot extends from a corner on a bottom surface to fit into each said recessed corner on said cross framework below, in which said bent arms are in the alternate extending direction
   d) means for rotating said plates on the flat horizontal surface, so that there is easy access to any compact disc stored within said storing means on said plates; and
   e) means for covering said uppermost plate to complete the configuration of said rack.

2. A height expandable rack for compact discs as recited in claim 1, wherein said rotating means includes:
   a) a lazy Susan base having four recessed corners on a top surface, so as to receive said feet of said lowermost plate; and
   b) four pads secured to a bottom surface of said lazy Susan base, so that said pads will sit upon the flat horizontal surface to maintain said lazy Susan base in a stabilized manner.

3. A height expandable rack for compact discs as recited in claim 2, wherein said covering means is a removable square shaped cap member having four feet, whereby each said foot extends from a corner on a bottom surface to fit into each said recessed corner on said cross framework of said uppermost plate.

4. A height expandable rack for compact discs as recited in claim 3, wherein each said cross framework is integrally formed with the top surface of each said respective plate and is fabricated out of a high impact plastic material, which can be of any color and even transparent.

5. A height expandable rack for compact discs as recited in claim 4, wherein said lazy Susan base is fabricated out of a high impact plastic material.

6. A height expandable rack for compact discs as recited in claim 5, wherein said removable square shaped cap member is fabricated out of said high impact plastic material.

7. A height expandable rack for compact discs as recited in claim 6, wherein each said pad is fabricated out of a rubber material.

8. A height expandable rack for compact discs as recited in claim 7, wherein each said plate further includes a knock out section at each said compartment, so that two single compact discs/one double compact disc can be stored in two said matching compartments in two said stacked plates, when said knock out section is removed from said upper stacked plate.

* * * * *